United States Patent Office 3,050,990
Patented Aug. 28, 1962

3,050,990
DISPLAY DEVICE FOR RECURRING ECHOES
Paul Renaut, Saint Maur, France, assignor to Société "Realisations Ultrasoniques," a corporation of France
Filed July 23, 1956, Ser. No. 599,508
Claims priority, application France July 29, 1955
1 Claim. (Cl. 73—67.8)

The invention relates to a device for displaying recurring echoes, which enables one to find easily the recurrence period $t$ thereof. Such devices are necessary, for instance, in radar submarine depth recording systems or systems for measuring the thickness of solid parts by means of recurring supersonic pulses.

The recurrence period $t$ of echoes obtained from reflection on obstacles is generally measured by displaying said echoes on the screen of a cathode ray tube scanned at a frequency $$\frac{1}{T}$$

along a horizontal axis, and by displaying on the same axis marking pulses, the recurrence period of which is known.

It is an object of the invention to provide a new device for displaying recurring echoes on the screen of a cathode ray tube, in which several successive echoes displayed as a series of light spots on said screen, make up a simple geometrical figure, e.g. a straight line arrangement of said spots, easily recognizable by the operator, when the recurrence period becomes coincident with the period of a tuned circuit the frequency of which is adjustable and which is comprised in the device or with a multiple or submultiple of said period.

Thus the tuning component of said tuned circuit may be calibrated in values of the period $t$ to be measured or of the corresponding distance to be measured (for instance: a thickness, in a supersonic thickness measuring device).

The invention will be more clearly understood from the following description and the appended drawings, in which.

Figure 1:
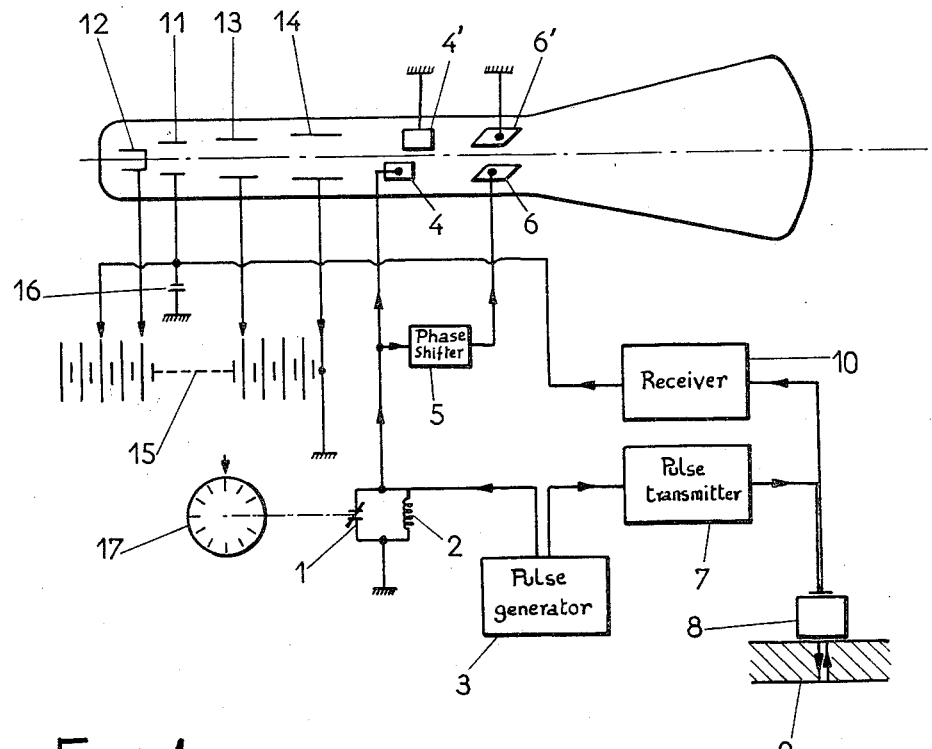
FIGURE 1 illustrates a thickness measuring device according to the invention.
Figure 2:
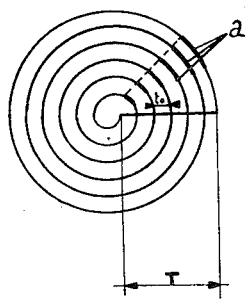
FIGURE 2 shows the geometrical figure obtained on the screen of the device of FIG. 1.

In FIG. 1, 1 and 2 are respectively the capacitor and the inductance coil of a tank circuit, which is connected, on the one hand to a pulse generator 3 and, on the other hand to one of the horizontal deflecting plates 4 of a cathode ray tube (the other horizontal deflecting plate 4' being grounded) and, through a phase shifter 5, to a vertical deflecting plate 6 (the other vertical deflecting plate 6' being grounded). The pulse generator 3 is connected, on the other hand, to a pulse transmitter 7, the output of which is connected to a piezo-electric transducer 8 laid on the part 9 to be inspected. Transducer 8 is also connected to the input of a pulse receiver 10. Repetition rate pulse generator 3, transmitter 7, transducer 8 and pulse receiver 10 form part of a conventional thickness measuring device, the operation of which is as follows: echoes which result from reflection, on the bottom surface of part 9, of supersonic pulses transmitted thereto from transducer 8, are obtained at the output of receiver 10. Their repetition rate is $$\frac{1}{t}$$

According to the invention, there is provided novel means for displaying said echoes. Said novel means essentially comprises, in combination, tank circuit 1—2, phase shifter 5, and the cathode ray tube. 12, 13 and 14 are respectively the cathode and anodes of the latter and are suitably biased by means of a battery 15. Control electrode 11 is connected to the output of receiver 10, and grounded by means of a condenser 16.

The rotor of variable condenser 1 is mechanically connected to a control knob 17 which is calibrated for indicating thickness. The operation of the above described novel display and measuring system is as follows:

The pulses generated by unit 3 with a period T shock tank circuit 1—2, thus generating a damped sine wave oscillation, the period $t_0$ of which is defined by inductance 2 and capacitor 1, the amplitude of said oscillation decreasing as a function of time until it reaches a zero value, after a time interval T which depends on the components of the tank circuit, and particularly their resistive losses, as well known in the art. Phase-shifter 5 is adjusted so that two damped sine waves phase-shifted by $$\frac{\pi}{2}$$

with respect to each other, is applied to plates 4 and 6. It will be understood that, under these conditions, a spiral scanning of the cathode ray tube screen is obtained, the light spot produced by the electron beam of the cathode ray tube moving from the outer edge of the screen to its center, a complete turn being traced out within a time interval equal to $t_0$. Only potential from source 15 being normally applied to grid 11, there is obtained but a faint spiral trace which is momentarily intensified each time an echo pulse is fed from receiver 10 to control electrode 11. Thus a series of bright spots $a$ corresponding to the individual echo pulses are visible on the screen and positioned along the spiral path. Their position on the spiral is of course dependent upon period $t$, which is proportional to the thickness of the part and given by the formula:

$$t = \frac{2e}{v}$$

where $e$ is said thickness and $v$ the propagation velocity of supersonic waves through the material the part is made of.

If $t = t_0$, successive echoes will appear on the screen as bright spots $a$ aligned along a radius of the spiral (as shown in FIG. 2); however if $t$ is a submultiple of $t_0$, the bright spots corresponding to echoes will be aligned along several radii of the spiral. For values of $t$ other than these particular values, the bright spots corresponding to echoes will not make up on the screen any determined geometrical figure. Therefore it will be easy to adjust the control knob 17 so that $t = t_0$, as the appearance of the spot configuration of FIG. 2 will enable the operator to find that knob position by which this result is obtained; then the value $e$ will be directly read on the knob calibration.

Of course many changes could be made in the above construction without departing from the scope of the invention, as defined in the appended claim.

What I claim is:

An apparatus for inspecting an object having pulse reflecting surfaces, comprising, in combination, cathode ray tube means having a control electrode for causing cathode ray emission upon application of voltages to said control electrode, a screen exposed to said cathode ray emission, and first and second pairs of cathode ray deflector elements for determining the path of the light spot produced on said screen by said cathode ray emission; a pulse generator delivering at its output sequences of primary pulses at predetermined primary pulse intervals; pulse transmitting means connected to said output for transmitting said primary pulses at said predetermined pulse intervals to the object to be inspected for being reflected by its pulse reflecting surfaces; second pulse transmitting means for transmitting echo pulses, derived from the reflection of each of said primary pulses at said reflecting surfaces during each of said primary pulse intervals, to said control electrode for causing intermittent intensified cathode ray emissions to said screen at the periodicity of said echo pulses; and adjustable cathode ray beam control means including tunable passive resonant circuit means connected between said output of said pulse generator means and said first pair of deflector elements, respectively, for being shock excited by said primary pulses and responding to each of said primary pulses by furnishing an alternating voltage having amplitudes decreasing with time and a variable frequency exceeding that of said primary pulses, said alternating voltage being applied to said first pair of deflector elements, phase shifter means being connected between said resonant circuit means and said second pair of deflector elements for applying to the latter said alternating voltage with a $$\frac{\pi}{2}$$

phase shift so that on said screen a spiral light spot path is determined in which identical phases of consecutive waves of said alternating voltage would appear, during said intensified cathode ray emissions, on said screen at points spaced from each other along a substantially straight radial line of said spiral path, said control means including means for varying said variable frequency, whereby, upon adjustment of said variable frequency so as to be equal to the periodicity of said echo pulses, a series of intensified light spots representing said echo pulses appears on the screen in a distinct substantially straight line arrangement, the thus adjusted value of said variable frequency being a direct indication of the spacing between the pulse reflecting surfaces of an inspected object of given material.

References Cited in the file of this patent

UNITED STATES PATENTS

| | | |
|---|---|---|
| 2,178,074 | Jakel et al. | Oct. 31, 1939 |
| 2,272,768 | Crosby | Feb. 10, 1942 |
| 2,280,226 | Firestone | Apr. 21, 1942 |
| 2,407,000 | Evans | Sept. 3, 1946 |
| 2,422,386 | Anderson | June 17, 1947 |
| 2,436,827 | Richardson et al. | Mar. 2, 1948 |
| 2,449,792 | Snyder | Sept. 21, 1948 |
| 2,481,354 | Schuler | Sept. 6, 1949 |
| 2,499,459 | Carlin | Mar. 7, 1950 |
| 2,514,482 | Farmer | July 11, 1950 |
| 2,593,865 | Erdman | Apr. 22, 1952 |
| 2,754,493 | Lippel | July 10, 1956 |
| 2,924,977 | Kenyon et al. | Feb. 16, 1960 |

FOREIGN PATENTS

| | | |
|---|---|---|
| 549,548 | Great Britain | Nov. 26, 1942 |

OTHER REFERENCES

Pages 637–642, Electrical Measurements, a text-book by Harris, published by Wiley in 1952.